Oct. 23, 1956 P. I. BRECHT 2,767,831
FLORAL DELIVERY CARTON
Filed March 2, 1953
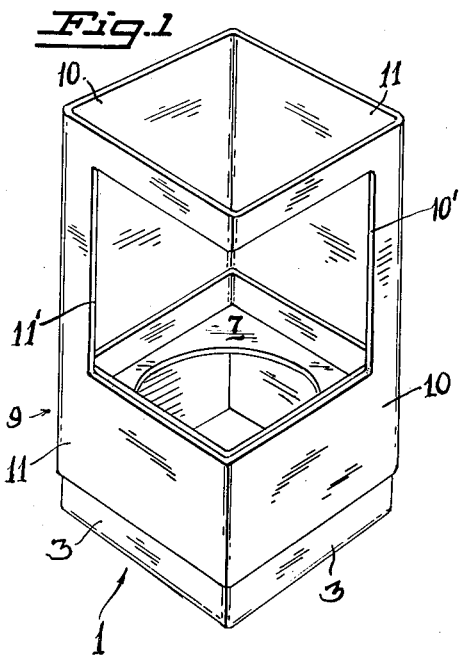
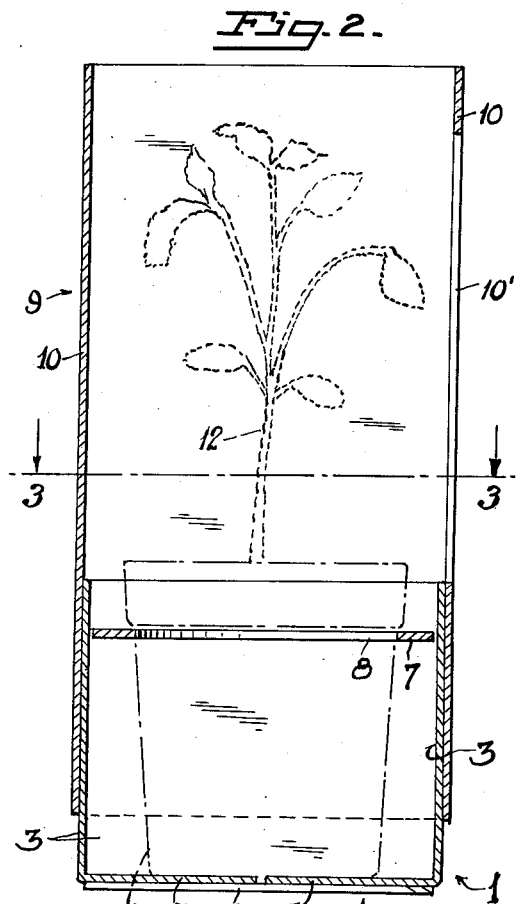
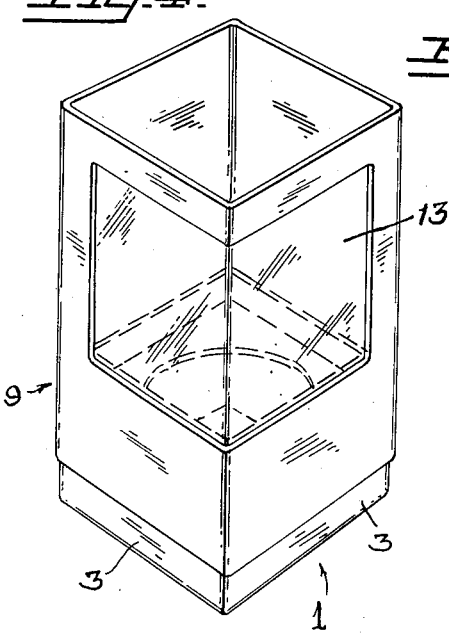
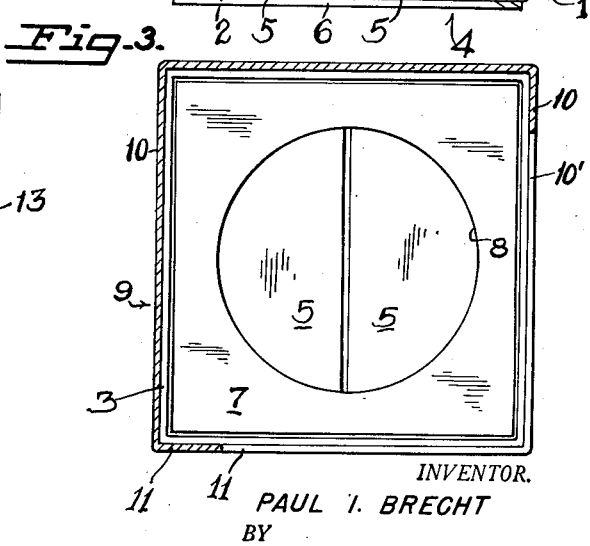
INVENTOR.
PAUL I. BRECHT
BY
J E Trabucco
ATTORNEY

United States Patent Office

2,767,831
Patented Oct. 23, 1956

2,767,831

FLORAL DELIVERY CARTON

Paul I. Brecht, Menlo Park, Calif.

Application March 2, 1953, Serial No. 339,580

2 Claims. (Cl. 206—45.31)

This invention relates to improvements in floral packages and more particularly to a floral display carton of the type adapted for use in packaging potted plants and cut flowers.

At the present time the customary method used by florists in packaging blooming potted plants and cut flowers delivered to customers is to enclose such a plant or flowers in one or more sheets of cellophane or paper to protect the blooms against possible damage in handling. Such a method of packaging does not always prevent damage to the plant or flowers, nor does it permit advantageous display thereof. It is only when the cellophane or paper covering is removed that the natural characteristics of the plant's foliage and blooms or of the flowers can be plainly seen and fully appreciated. In view of these disadvantages in plant packaging, it has long been the desire of florists and nurserymen to have available an inexpensive carton or package in which a potted plant or cut flowers could be attractively displayed and at the same time protected against damage in handling.

The present invention provides just such a carton, one which is adapted to securely hold a potted plant or a vase containing cut flowers and protect the foliage and blooms against damage in handling, and at the same time permit the display thereof in a framed position in which their natural coloring and visible characteristics are advantageously exhibited. Another desirable feature is that my improved carton may be shipped and stored in a compact collapsed form, and when it is to be used it is capable of being readily set up.

The primary object of my invention is to provide an inexpensive display carton of the kind characterized, one which is adapted to hold a potted plant and normally protect its blooms and foliage against damage in handling, and at the same time permit the advantageous display thereof.

Other and further objects of my invention will be pointed out hereinafter, or will be indicated in the appended claims or will be obvious to one skilled in the art upon an understanding of the present disclosure. For the purpose of this application I have elected to show herein certain forms and details of a floral display carton representative of my invention; it is to be understood, however, that the embodiment of my invention herein shown and described is for the purpose of illustration only and that therefore it is not to be regarded as exhaustive of the variations of the invention in the art.

In the accompanying drawing:

Fig. 1 is a perspective view of a floral display carton embodying my invention;

Fig. 2 is a longitudinal sectional view, on an enlarged scale, showing the normal position of a plant pot by the broken lines;

Fig. 3 is a sectional view taken on the line 3—3 of Fig. 2; and

Fig. 4 is a perspective view of another embodiment of my invention in which the window opening is closed by a transparent member.

Referring to the drawing the numeral 1 designates a five sided pot container or receptacle made preferably from cardboard and having a top opening through which a pot 2 or a vase holding cut flowers may be inserted and removed. The pot or vase container is preferably, although not necessarily, rectangular in horizontal cross-section and it has four upright connected sides 3 and a bottom 4, the latter comprising a well known construction in which two short extensions 5, 5 connected to two opposed upright sides overlie two other short extensions 6, 6 connected to the other two upright sides. The extensions 5 and 6 forming the bottom 4 are held against relative displacement by an adhesive or other suitable means. The container 1, prior to its being set up, is in a collapsed form in which two of the sides 3 overlie the other two sides and two of the extensions 5 and 6 overlie the other two extensions 5 and 6. The upper fixed edges of the upright sides 3 preferably lie in a substantially horizontal plane, and such sides have smooth outer surfaces extending throughout their full height. Since it is old in the art to provide collapsible cartons, it is not considered necessary to illustrate the container 1 in its collapsed form. So as to prevent the pot 2 from becoming displaced from a centered position in the container 1, a stiff rectangular shaped cardboard member 7, or other suitable material, is positioned in the container in an encircling and embracing position with respect to the pot. The stiff rectangular shaped member 7 is adapted to snugly but removably fit in the container 1 and the size of its central hole 8 is such that the converging sides of the pot 2 are adapted to closely fit against the sides of the hole and thereby normally prevent the stiff member from dropping downwardly onto the bottom of the container.

Mounted for vertical adjustment on the container 1 is a tubular enclosure 9 having a rectangular cross-sectional shape in which two of the opposed sides 10, 10 are connected to the other two opposed sides 11, 11. The size of the enclosure 9 is such that its sides 10 and 11 extend around and snugly fit against the upright sides 3 of the pot container 1, thereby normally holding the enclosure in a suitably adjusted position with respect to the container. Two adjacent connected sides 10 and 11 of the enclosure 9 have openings 10' and 11', respectively, such openings being preferably connected to form a single large window opening through which a plant 12 held in the pot 2 may be plainly visible from different viewing positions spaced up to ninety degrees or more from each other. The lower edges of the window openings 10' and 11' of the vertically adjustable enclosure 9 are positioned in a substantially horizontal plane as are the upper fixed edges of the container 1. The large window opening in the sides of the enclosure 9 makes it possible for substantially the entire upper structure of the plant to be plainly seen when viewed from a position in front of the enclosure, and the sides of the large window opening form a frame, which together with the background provided by the rearwardly disposed sides 10 and 11, permit the plant and its blooms to be advantageously displayed. The height of the lower portion of the tubular enclosure 9 between its lower edge and the lower edge of the window opening 10', 11' is considerably less than the height of the plant container, thereby making it possible for the lower edge of such window opening to be adjusted downwardly below the upper edge of the container to shorten the height of such window opening. The enclosure, prior to its being set up, is in a collapsed form in which two of the sides 10 and 11 are positioned in overlying positions with respect to the other two sides 10 and 11. The height of the enclosure 9 is substantially greater than the height of the container 1.

When the height of the plant is such that the window opening is not properly positioned for the suitable or the advantageous display of such plant, the enclosure may be raised or lowered with respect to the container 1 by sliding the said enclosure upwardly or downwardly. Since the sides of the container 1 have no exterior protrusions thereon the enclosure 9 may be adjusted downwardly to a position in which its lower edge engages with the surface upon which the display carton is supported. In the adjustment of the enclosure 9 on the container 1 the upper edge of the container stays in a fixed position while the upper edge of the window opening changes its relative position with respect thereto. Thus when the enclosure is adjusted downwardly on the container to such an extent that the upper edge of the window opening becomes positioned closer to the upper edge of the container, the height of the window opening is decreased, thereby making it possible to properly center a comparatively short plant with respect to the then smaller window opening.

The size and shape of the window opening 10', 11' may be changed if so desired, and if it is considered advisable in displaying certain kinds of plants or cut flowers, the window opening may be arranged only in one of the sides 10 or 11 of the enclosure rather than in two adjacent sides. Although not particularly necessary for protection purposes the enclosure may be provided with a lid of the usual kind, or with a detachable envelope or covering. It is also to be noted that the shapes of the container 1 and the enclosure 9 may vary, and in this respect the combined length of these two elements may be such that an elongated plant or cut flower receptacle can be supported therein instead of a pot.

In the embodiment of my invention shown in Fig. 4 the enclosure 9 is shown as having a window opening 10', 11', which is enclosed by a transparent window pane 13, made from a sheet of cellophane or other suitable material.

What I claim is:

1. In a display carton for potted plants or the like, a plant holding container having a top opening, a bottom and upstanding joined sides, the sides having fixed upper edges lying in a substantially horizontal plane, a tubular enclosure mounted for up and down adjustment on the container and arranged with its lower portion snugly embracing the sides of the container, the enclosure being adjustable on the container to a position wherein the lower edge of such enclosure is in substantially horizontal alignment with the bottom of the container, and a window opening in adjoining sides of the enclosure and having its lower edge lying in a substantially horizontal plane, the height of the lower portion of the enclosure between the lower edge thereof and the lower edge of the window opening being less than the height of the container, the position of the window opening of the enclosure being such that when the lower edge of the window opening and the upper edge of the container are positioned in substantially the same horizontal plane, the lower edge of the enclosure will be appreciably above the bottom of the container, and the window opening being of such height that when the lower edge of the enclosure is in a substantially common horizontal plane with the bottom of the container, a substantial portion of such window opening will extend above the fixed upper edge of the container.

2. In a display carton for potted plants or the like, a plant holding container having a top opening, a bottom and upstanding joined sides, the sides having fixed upper edges, a tubular enclosure mounted for up and down adjustment on the container and having its lower portion snugly embracing the sides of the container, the enclosure being adjustable on the container to a position wherein the lower edge of such enclosure is in substantially horizontal alignment with the bottom of the container, and a window opening in a side of the enclosure, the height of the lower portion of the enclosure between the lower edge thereof and the lower edge of the window opening being less than the height of the container, the position of the window opening of the enclosure being such that when the lower edge of the window opening and the upper edge of the container are in substantially horizontal alignment, the lower edge of the enclosure will be appreciably above the bottom of the container, and the window opening being of such height that when the lower edge of the enclosure is in substantially horizontal alignment with the bottom of the container, a substantial portion of such window opening will extend above the fixed upper edge of the container.

References Cited in the file of this patent

UNITED STATES PATENTS

| | | |
|---|---|---|
| D. 125,781 | Nagle | Mar. 11, 1941 |
| 577,055 | Mooers | Feb. 16, 1897 |
| 799,593 | Dohme | Sept. 12, 1905 |
| 1,581,921 | Doble | Apr. 20, 1926 |
| 1,991,478 | Wedge | Feb. 19, 1935 |
| 2,064,707 | Wilson | Dec. 15, 1936 |
| 2,162,089 | Kagen | June 13, 1939 |
| 2,367,706 | Williamson | Jan. 23, 1945 |
| 2,426,911 | Williamson | Sept. 2, 1947 |
| 2,683,953 | Hopkins | July 20, 1954 |